US012618488B2

(12) United States Patent (10) Patent No.: US 12,618,488 B2
Feng et al. (45) Date of Patent: May 5, 2026

(54) ELECTROMAGNETIC VALVE AND ELECTROMAGNETIC VALVE ASSEMBLY

(71) Applicant: ZHEJIANG DUNAN ARTIFICIAL ENVIRONMENT CO., LTD., Shaoxing (CN)

(72) Inventors: Zhongbo Feng, Shaoxing (CN); Wenrong Zhang, Shaoxing (CN); Fugang Wang, Shaoxing (CN); Zhepeng Li, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 304 days.

(21) Appl. No.: 18/369,178

(22) Filed: Sep. 17, 2023

(65) Prior Publication Data

US 2024/0003459 A1 Jan. 4, 2024

Related U.S. Application Data

(63) Continuation of application No. PCT/CN2022/074848, filed on Jan. 28, 2022.

(30) Foreign Application Priority Data

Mar. 23, 2021 (CN) .......................... 202120593934.6

(51) Int. Cl.
F16K 31/04 (2006.01)
F16K 1/36 (2006.01)
(52) U.S. Cl.
CPC .............. F16K 31/047 (2013.01); F16K 1/36 (2013.01)

(58) Field of Classification Search
CPC .................................. F16K 1/36; F16K 31/047
See application file for complete search history.

(56) References Cited

U.S. PATENT DOCUMENTS

| | | | | |
|---|---|---|---|---|
| 1,815,612 A | * | 7/1931 | Cataline | .................. F01L 1/462 |
| | | | | 251/337 |
| 2,875,779 A | * | 3/1959 | Campbell | ................. F16K 1/54 |
| | | | | 137/543.17 |

(Continued)

FOREIGN PATENT DOCUMENTS

| | | |
|---|---|---|
| CN | 103307310 A | 9/2013 |
| CN | 205654942 U | 10/2016 |

(Continued)

OTHER PUBLICATIONS

First Notice of Reasons for Refusal of KR10-2023-7036043, Nov. 26, 2024.

(Continued)

*Primary Examiner* — Eric Keasel

(57) ABSTRACT

An electromagnetic valve and an electromagnetic valve assembly are provided. The electromagnetic valve includes a first elastic member. An end of the first mounting cavity proximal to the valve port is provided with a limiting portion integrated with the valve body, the first elastic member is sleeved on the plugging assembly. One end of the first elastic member abuts against the plugging assembly, the other end of the first elastic member abuts against the valve body, and an outer surface of the other end of the first elastic member abuts against the limiting portion.

12 Claims, 3 Drawing Sheets

(56) References Cited

U.S. PATENT DOCUMENTS

| | | | | |
|---|---|---|---|---|
| 7,008,195 B2 * | 3/2006 | McGrath | .............. | F04B 35/045 |
| | | | | 251/337 |
| 9,285,054 B2 * | 3/2016 | Matsumoto | ......... | F16K 31/0655 |
| 9,404,600 B2 * | 8/2016 | Kainuma | .............. | F16K 31/406 |
| 2002/0003221 A1 | 1/2002 | Koyama et al. | | |
| 2018/0372129 A1 | 12/2018 | Kato et al. | | |

FOREIGN PATENT DOCUMENTS

| | | | | | |
|---|---|---|---|---|---|
| CN | 106931169 A | | 7/2017 | | |
| DE | 102013111456 A1 | | 4/2015 | | |
| EP | 2515015 A1 * | 10/2012 | | ............ | F16K 31/52 |
| EP | 4206506 A1 | | 7/2023 | | |
| JP | 201436548 A | | 2/2014 | | |
| JP | 2021006729 A | | 1/2021 | | |
| KR | 20130031129 A | | 3/2013 | | |
| WO | WO2017156831 A1 | | 9/2017 | | |
| WO | WO2020136694 A1 | | 7/2020 | | |

OTHER PUBLICATIONS

International Search Report of PCT/CN2022/074848.
Notice of Reasons for Refusal of JP2023549834
Notice of first review opinion of EP22773914.1.

* cited by examiner

ELECTROMAGNETIC VALVE AND ELECTROMAGNETIC VALVE ASSEMBLY

CROSS-REFERENCE TO RELATED APPLICATIONS

This application is a continuation of international patent application No. PCT/CN2022/074848, filed on Jan. 28, 2022, which itself claims priority to Chinese patent application No. 202120593934.6, filed on Mar. 23, 2021, titled "ELECTROMAGNETIC VALVE AND ELECTROMAGNETIC VALVE ASSEMBLY", which is hereby incorporated by reference.

TECHNICAL FIELD

The present disclosure relates to a field of a valve device, and in particular, to an electromagnetic valve and an electromagnetic valve assembly.

BACKGROUND

An electromagnetic valve has a complex structure and cannot be quickly assembled with air conditioning pipelines or other module components, so that mounting efficiency is low. In addition, a spring is provided between a bottom of a valve body and a plugging assembly, and the plugging assembly is driven by an elastic force of the spring to open the valve port, so that the valve is opened. However, the spring in the related art is integrated with the valve body in a riveting form, which can cause the following problems such as a complicated assembly process of the spring, inability to disassemble the spring in the later stage, improved processing difficulty and increased manufacturing costs of the valve body. In the related art, an additional limiting member can be provided to limit the spring. However, the additional limiting member also increases assembly steps of the electromagnetic valve. Moreover, the limiting member may move relative to the valve body during an operation of the electromagnetic valve, resulting in limitation of the spring is not stable enough, which is a hidden danger.

SUMMARY

For solving the above problem, it is necessary to provide an electromagnetic valve and an electromagnetic valve assembly.

To achieve the above objectives, technical solutions provided by the present disclosure are as follows.

The electromagnetic valve includes a valve body and a plugging assembly. The valve body is provided with a first mounting cavity and a valve port. The plugging assembly is accommodated in the first mounting cavity for opening or closing the valve port. The electromagnetic valve further includes a first elastic member, an end of the first mounting cavity proximal to the valve port is provided with a limiting portion integrated with the valve body, and the first elastic member is sleeved on the plugging assembly. One end of the first elastic member abuts against the plugging assembly, the other end of the first elastic member abuts against the valve body, and an outer surface of the other end of the first elastic member abuts against the limiting portion.

It is understood that when an end of the first elastic member away from the plugging assembly is not limited, an offset or a side bend of the first elastic member can be generated when the first elastic member moves back and forth along an axis of the valve body. In this way, the first elastic member cannot always move linearly along the axis of the valve body, resulting in an offset of a direction of a driving force applied on the plugging assembly by the first elastic member, thereby affecting sealing effect of the plugging assembly on the valve port. In the present disclosure, the limiting portion can be provided to limit and position the first elastic member, thus preventing the first elastic member from offsetting or side bending caused by moving along a radial direction of a cross section of the first elastic member and ensuring that the first elastic member moves linearly along the axis of the valve body. In addition, a friction force can be applied on the other end of the first elastic member by the limiting portion, which is conducive to preventing the other end of the first elastic member from entangling with a middle part of the first elastic member during reciprocating compression and extension of the first elastic member. Furthermore, in the present disclosure, the limiting portion is integrated with the valve body, thus preventing increasing assembly steps of the electromagnetic valve, which is conducive to improving overall assembly efficiency of the electromagnetic valve. In addition, the limiting portion can be avoided to move relative to the valve body during operation, thus affecting limiting effect of the first elastic member.

In some embodiments, the limiting portion is a protrusion disposed in the first mounting cavity and extending along an axial direction of the plugging assembly and the outer surface of the first elastic member abuts against a side surface of the protrusion.

It is understood that the limiting portion can be a protrusion and the protrusion can be simple in structure, thus reducing difficulty of processing the valve body.

In some embodiments, a bottom of the first mounting cavity at an end of the first mounting cavity proximal to the valve port is concave and defined as a limiting groove, and a groove surface of the limiting groove is defined as the limiting portion. An end of the first elastic member proximal to the valve port is accommodated in the limiting groove, and the outer surface of the first elastic member abuts against the groove surface of the limiting groove.

It is understood that the limiting portion can be the limiting groove defined by a concave bottom of the first mounting cavity. In this way, the limiting portion can be simple in structure and easy to process, which is conducive to reducing difficulty of processing the valve body and reducing manufacturing costs of the electromagnetic valve.

In some embodiments, an end of the first elastic member proximal to the valve port is provided with a first inelastic section.

It is understood that the first inelastic section can be provided on the first elastic member, the first inelastic section cannot be compressed or extend, so that a possibility of the first inelastic section entangling with the middle area of the first elastic member can be reduced.

In some embodiments, the limiting portion is a protrusion or a limiting groove, the protrusion is disposed in the first mounting cavity and extends along an axial direction of the plugging assembly. The bottom of the first mounting cavity at the end of the first mounting cavity proximal to the valve port is concave and defined as the limiting groove. And a height of the protrusion or a depth of the limiting groove is equal to or less than a height of the first inelastic section.

It is understood that the height of the protrusion or the depth of the limiting groove can be equal to or less than the height of the first inelastic section, which is conducive to preventing the height of the protrusion or the depth of the limiting groove from being too great to affect an amplitude of reciprocating compression or extension of the first elastic member, thereby affecting the driving force applied on the plugging assembly by the first elastic member, and affecting opening the electromagnetic valve.

In some embodiments, the first elastic member is a spring, an end of the spring proximal to the valve port is provided with at least two coils of spring wires attached to each other, and the at least two coils of spring wires of the spring are defined as the first inelastic section.

In some embodiments, the height of the protrusion or the depth of the limiting groove is equal to or less than a sum of wire diameters of the two coils of the spring wires attached to each other.

It is understood that the height of the protrusion or the depth of the limiting groove can be equal to or less than the sum of wire diameters of the two coils of the spring wires attached to each other, which is conducive to preventing the height of the protrusion or the depth of the limiting groove from being too great to affect an amplitude of reciprocating compression or extension of the spring, thereby affecting efficiency of opening the electromagnetic valve.

In some embodiments, an end of the first elastic member away from the valve port is provided with a second inelastic section, and the second inelastic section abuts against an end of the plugging assembly away from the valve port.

It is understood that the second inelastic section is conducive to preventing the other end of the first elastic member away from the valve port from entangling with the middle area of the first elastic member.

In some embodiments, an end of the plugging assembly abutting against the first elastic member is provided with a groove portion. The second inelastic section is accommodated in the groove portion, and an outer surface of the second inelastic section abuts against a side wall of the groove portion proximal to the first mounting cavity.

It is understood that the groove portion is provided, so that the second inelastic section can be accommodated in the groove portion to play a role of limiting and positioning the first elastic member.

In some embodiments, a depth of the groove portion is equal to or less than a height of the second inelastic section.

It is understood that the depth of the groove portion can be equal to or less than the height of the second inelastic section. In this way, the depth of the groove portion can be prevented from being too great, thereby causing a groove surface of the groove portion to hinder the compression and extension of the first elastic member.

In some embodiments, the first elastic member is the spring. An end of the spring abutting against the plugging assembly is provided with at least two coils of spring wires attached to each other, the at least two coils of spring wires of the spring are defined as the second inelastic section. And the depth of the groove portion is equal to or less than a sum of wire diameters of the two coils of the spring wires attached to each other.

In some embodiments, a diameter of the first mounting cavity of the valve body is greater than an outer diameter of the first elastic member.

It is understood that the diameter of the first mounting cavity of the valve body can be greater than the outer diameter of the first elastic member, thus effectively avoiding friction caused by contact between a side wall of the first mounting cavity and the first elastic member, and avoiding affecting a speed of contraction or extension of the first elastic member.

In some embodiments, the present disclosure provides an electromagnetic valve assembly, including a mounting base and an electromagnetic valve of any of embodiments above. The electromagnetic valve is detachably connected to the mounting base.

It is understood that the electromagnetic valve can be detachably connected to the mounting base, so as to reduce difficulty of assembly and disassembly between the electromagnetic valve and the mounting base, thus realizing a rapid connection or separation between the electromagnetic valve and the mounting base, and improving mounting efficiency of the electromagnetic valve.

In some embodiments, an end of the mounting base away from the valve port is provided with a mounting groove, the mounting groove is provided with a sealing member, and the mounting base is sealed with and connected to the valve body by the sealing member.

Compared with the related art, beneficial effects of the above technical solution are as follows.

In the present disclosure, the limiting portion can be provided to limit and position the first elastic member, thus preventing the first elastic member from offsetting or side bending caused by moving along a radial direction of a cross section of the first elastic member and ensuring that the first elastic member moves linearly along the axis of the valve body. In addition, a friction force can be applied on the other end of the first elastic member by the limiting portion, which is conducive to preventing the other end of the first elastic member from entangling with a middle part of the first elastic member during reciprocating compression and extension of the first elastic member. Furthermore, in the present disclosure, the limiting portion is integrated with the valve body, thus preventing increasing assembly steps of the electromagnetic valve, which is conducive to improving overall assembly efficiency of the electromagnetic valve. In addition, the limiting portion can be avoided to move relative to the valve body during operation, thus affecting limiting effect of the first elastic member.

In the figures, 100 represents an electromagnetic valve, 200 represents an electromagnetic valve assembly, 1 represents a valve body, 11 represents a first mounting cavity, 12 represents a valve port, 13 represents a limiting portion, 131 represents a protrusion, 14 represents a valve seat, 141 represents an extending portion, 142 represents a first step, 143 represents a first groove, 15 represents a valve cover, 151 represents a concave cavity, 16 represents a clamping portion, 17 represents a connecting portion, 171 represents a first thread portion, 18 represents an inlet channel, 19 represents an outlet channel, 2 represents a plugging assembly, 21 represents a groove portion, 22 represents a pilot valve port, 23 represents a pilot hole, 3 represents a first elastic member, 31 represents a first inelastic section, 32 represents a second inelastic section, 4 represents an electromagnetic driving assembly, 41 represents a sleeve, 42 represents an electromagnetic coil, 43 represents a stator, 44 represents a rotor, 45 represents a second mounting cavity, 46 represents a valve pin, 47 represents a second elastic member, 48 represents a valve pin elastic member, 49 represents a magnetic conducting frame, 5 represents a mounting base, 51 represents a mounting groove, 52 represents a second step, and 6 represents a sealing member.

DETAILED DESCRIPTION OF THE EMBODIMENT

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. All other embodiments obtained by those skilled in the art based on the embodiments of the present disclosure without departing from the inventive scope are the scope of the present disclosure.

It should be noted that when a component is referred to as being "mounted on" another component, it may be directly mounted on the other component or a further element may be presented between them. When a component is referred to as being "disposed on" another component, it may be directly disposed on the other component or a further element may be presented between them. When a component is referred to as being "fixed to" another component, it may be directly fixed to the other component or a further element may be presented between them.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "or/and" as used herein includes any and all combinations of one or more of the associated listed items.

Figure 1:
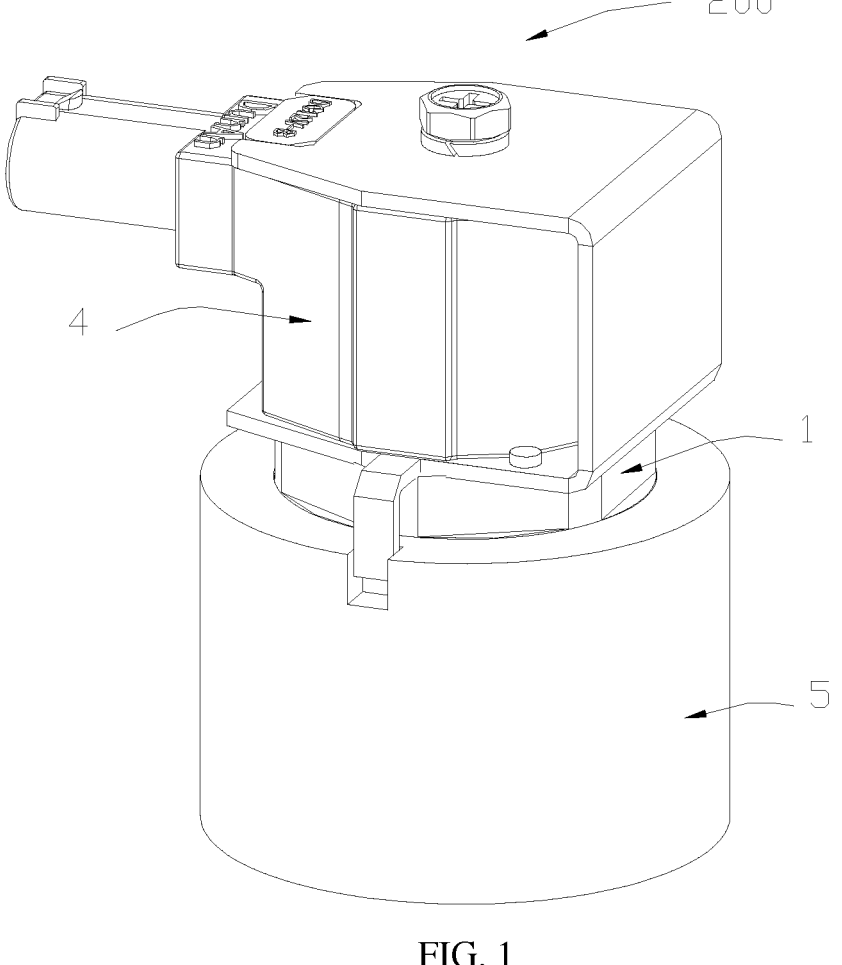
FIG. 1 is a schematic view of an electromagnetic valve assembled with a mounting base in an embodiment of the present disclosure.
Figure 2:
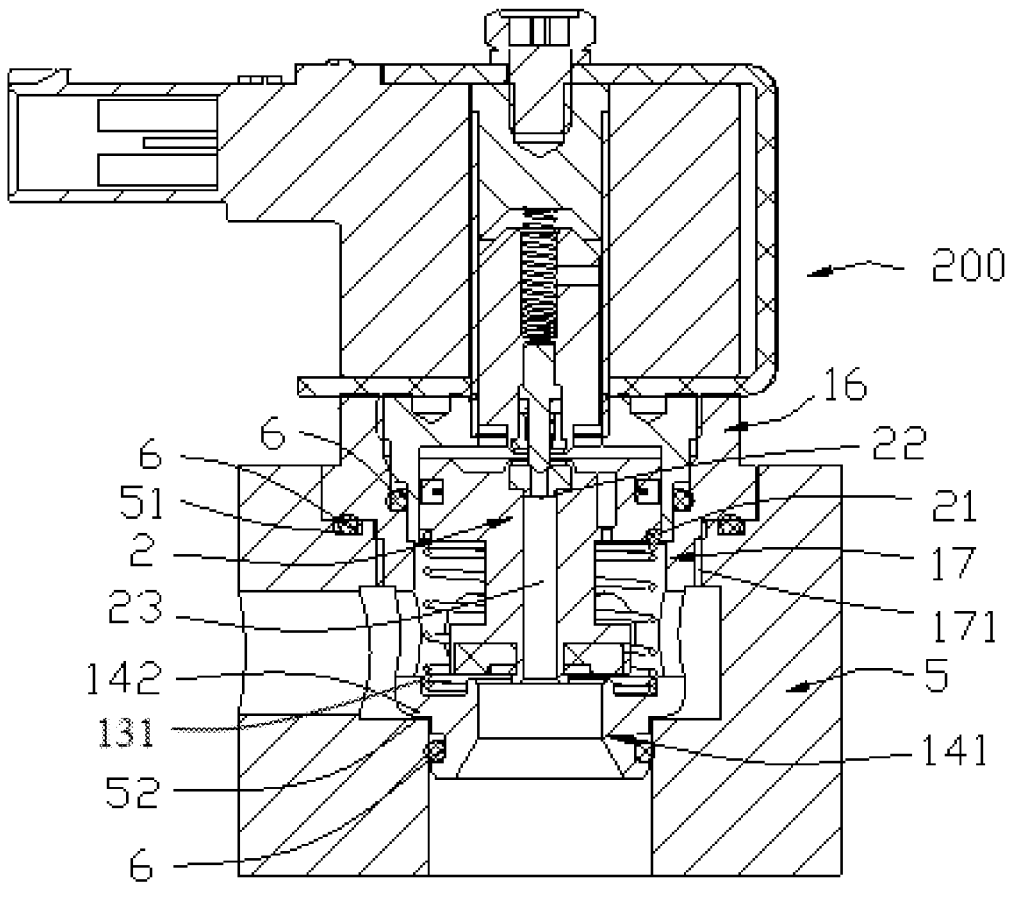
FIG. 2 is a longitudinal sectional schematic view of the electromagnetic valve assembled with the mounting base in FIG. 1.
Figure 3:
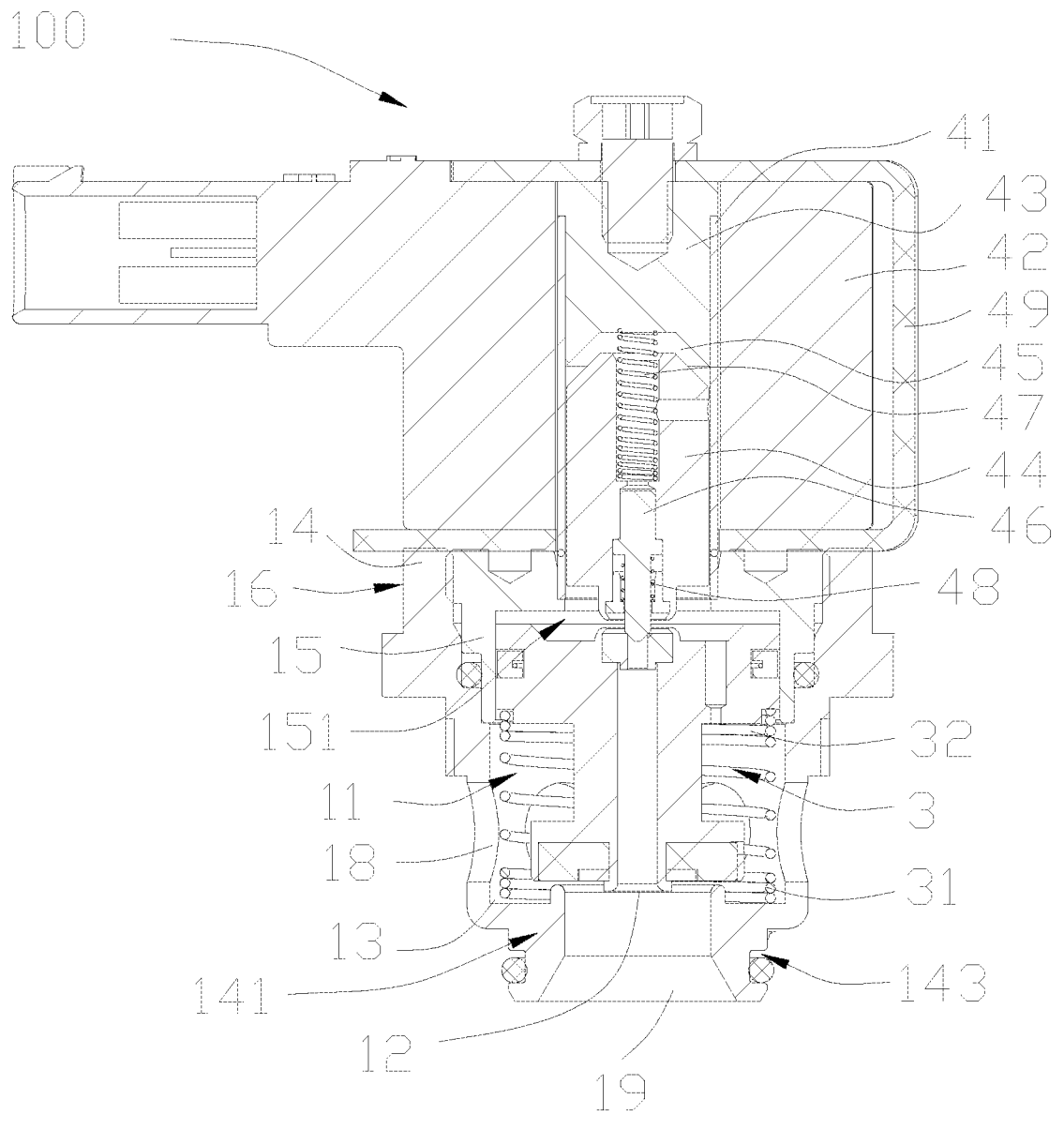
FIG. 3 is a sectional schematic view of an electromagnetic valve of the present disclosure.

Referring to FIG. 1 to FIG. 3, the present embodiment provides an electromagnetic valve 100, and the electromagnetic valve 100 includes a valve body 1 and a plugging assembly 2. The electromagnetic valve 100 can be configured for controlling on/off of a medium in a pipeline or a flow rate of the media. The valve body 1 is provided with a first mounting cavity 11, the first mounting cavity 11 is provided with a valve port 12 connected to and in communication with external environment. The plugging assembly 2 is accommodated in the first mounting cavity 11 for opening or closing the valve port 12, and the plugging assembly 2 can be sealed with and slidably connected to a sidewall of the first mounting cavity 11.

Specifically, the electromagnetic valve 100 further includes a first elastic member 3, and the first elastic member 3 can be compressed or expand along an axis of the electromagnetic valve 100. The first elastic member 3 can drive the plugging assembly 2 to move away from the valve port 12 when the first elastic member 3 expands, so that the electromagnetic valve 100 is opened. An end of the first mounting cavity 11 proximal to the valve port 12 is provided with a limiting portion 13 integrated with the valve body 1. The first elastic member 3 is sleeved on the plugging assembly 2. One end of the first elastic member 3 abuts against the plugging assembly 2, the other end of the first elastic member 3 abuts against the valve body 1, and an outer surface of the other end of the first elastic member 3 abuts against the limiting portion 13.

In the related art, a spring is integrated with the valve body in a riveting form, which can cause the following problems such as a complicated assembly process of the spring, a spring that cannot be disassembled in the later, improved processing difficulty and increased manufacturing costs of the valve body. In the related art, an additional limiting member can be provided to limit the spring. However, the additional limiting member provided in the related art also increases assembly steps of the electromagnetic valve. Moreover, the limiting member may move relative to the valve body during an operation of the electromagnetic valve, resulting in limitation of the spring is not stable enough, which is a hidden danger.

However, in the present disclosure, the limiting portion 13 integrated with the valve body 1 can be provided to limit and position the first elastic member 3, thus preventing the first elastic member 3 from offsetting or side bending caused by moving along a radial direction of a cross section of the first elastic member and ensuring that the first elastic member 3 moves linearly along the axis of the valve body 1. In addition, a friction force can be applied on the other end of the first elastic member 3 by the limiting portion 13, which is conducive to preventing the other end of the first elastic member 3 from entangling with a middle area of the first elastic member 3 during reciprocating compression and extension of the first elastic member 3. Furthermore, in the present disclosure, the limiting portion 13 is integrated with the valve body 1, thus preventing increasing assembly steps of the electromagnetic valve 100, which is conducive to improving overall assembly efficiency of the electromagnetic valve 100. In addition, the limiting portion 13 can be avoided to move relative to the valve body 1 during operation, thus affecting limiting effect of the first elastic member 3.

In an embodiment, referring to FIG. 2 and FIG. 3, the limiting portion 13 can be a protrusion 131 disposed in the first mounting cavity 11 and extending along an axial direction of the plugging assembly 2, and the outer surface of the first elastic member 3 abuts against a side surface of the protrusion 131. The protrusion 131 can be disposed at bottom of the first mounting cavity 11, or the protrusion 131 can be disposed on the side wall of the first mounting cavity 11. The protrusion 131 can be simple in structure and easy to process, which is conducive to reducing difficulty of processing the valve body 1 and reducing manufacturing costs of the electromagnetic valve 100. In other embodiments, the specific structure of the limiting portion 13 is not limited to the above or as described in the figures.

In other embodiments, a bottom of the first mounting cavity 11 at an end of the first mounting cavity 11 proximal to the valve port 12 can be concave and defined as a limiting groove, and a groove surface of the limiting groove is defined as the limiting portion 13. An end of the first elastic member 3 away from the plugging assembly 2 can be accommodated in the limiting groove, and the outer surface of the first elastic member 3 abuts against the groove surface of the limiting groove.

In an embodiment, referring to FIG. 2 and FIG. 3, an end of the first elastic member 3 proximal to the valve port 12 can be provided with a first inelastic section 31. The first inelastic section 31 cannot be compressed or extend, so that a possibility of the first inelastic section 31 entangling with the middle part of the first elastic member 3 can be reduced.

Alternatively, the height of the protrusion 131 or the depth of the limiting groove can be equal to or less than the height of the first inelastic section 31, which is conducive to preventing the height of the protrusion 131 or the depth of the limiting groove from being too great to affect an amplitude of reciprocating compression or extension of the first elastic member 3, thereby affecting the driving force applied on the plugging assembly 2 by the first elastic member 31, and affecting opening the electromagnetic valve.

In an embodiment, the first elastic member 3 can be a spring, an end of the spring away from the plugging assembly 2 can be provided with at least two coils of spring wires attached to each other, and the at least two coils of spring wires of the spring can be defined as the first inelastic section. It can be understood that the spring wires can spirally form a plurality of coils, the first inelastic section 31 can be formed by at least two coils of spring wires attached to each other. The attached at least two coils of spring wires cannot move relative to each other, so that the first inelastic section 31 cannot be compressed or extend. In other embodiments, the first elastic member 3 is not limited to the spring, but can also be other elastic elements.

Alternatively, the height of the protrusion 131 or the depth of the limiting groove is equal to or less than a sum of wire diameters of the two coils of the spring wires attached to each other, which is conducive to preventing the height of the protrusion 131 or the depth of the limiting groove from being too great to affect an amplitude of reciprocating compression or extension of the spring, thereby affecting efficiency of opening the electromagnetic valve.

In an embodiment, referring to FIG. 2 and FIG. 3, an end of the first elastic member 3 away from the valve port 12 can be provided with a second inelastic section 32, and the second inelastic section 32 can abut against an end of the plugging assembly 2 away from the valve port 12. It is understood that the second inelastic section 32 can be conducive to preventing the other end of the first elastic member 3 away from the valve port 12 from entangling with the middle area of the first elastic member 3.

Alternatively, an end of the plugging assembly 2 abutting against the first elastic member 3 can be provided with a groove portion 21. The second inelastic section 32 can be accommodated in the groove portion 21, and an outer surface of the second inelastic section 32 can abut against a side wall of the groove portion 21 proximal to the first mounting cavity 11. It is understood that the groove portion 21 can be provided, so that the second inelastic section 32 can be accommodated in the groove portion 21. The groove portion 21 can be cooperate with the limiting portion 13 to further strengthen limitation and position of the first elastic member 3, so as to ensure stability of a movement process of the first elastic member 3.

Alternatively, the depth of the groove portion 21 can be equal to or less than the height of the second inelastic section 32. In this way, the depth of the groove portion 21 can be prevent from being too great, thereby causing a groove surface of the groove portion 21 to hinder the compression and extension of the first elastic member 3.

In an embodiment, the first elastic member 3 can be the spring. An end of the spring abutting against the plugging assembly 2 can be provided with at least two coils of spring wires attached to each other, the at least two coils of spring wires of the spring can be defined as the second inelastic section 32. And the depth of the groove portion 21 can be equal to or less than a sum of wire diameters of the two coils of the spring wires attached to each other.

In an embodiment, a diameter of a part of the first mounting cavity 11 of the valve body 1 can be greater than an outer diameter of the first elastic member 3, thus effectively avoiding friction caused by contact between a part of the side wall of the first mounting cavity 11 and the first elastic member 3, and avoiding affecting a speed of contraction or extension of the first elastic member 3.

The present disclosure provides an electromagnetic valve assembly 200, including a mounting base 5 and an electromagnetic valve 100 of any of embodiments above. The electromagnetic valve 100 can be detachably connected to the mounting base 5. Difficulty of assembly and disassembly between the electromagnetic valve 100 and the mounting base 5 can be reduced, thus realizing a rapid connection or separation between the electromagnetic valve 100 and the mounting base 5, and improving mounting efficiency of the electromagnetic valve.

Specifically, in the present embodiment, referring to FIG. 1 to FIG. 3, the valve body 1 can include a valve seat 14, and the valve seat 14 is provided with a first mounting cavity 11. A clamping portion 16 and a connecting portion 17 can be provided from top to bottom of the valve seat 14 successively along an axis thereof. An outer surface of the connecting portion 17 is provided with a first thread portion 171, and the mounting base 5 is provided with a second thread portion (not shown) correspondingly. The first thread portion 171 can be connected to the second thread portion to achieve rapid assembly of the valve seat 14 and the mounting base 5. A specific structural form of the mounting base 5 is not limited to the form described in the disclosure or shown in the figures, and the mounting base 5 may also be any middle member connected to air conditioning pipelines or air conditioning components.

Specifically, in the present embodiment, an outer diameter of the clamping portion 16 can be greater than an outer diameter of the connecting portion 17, and a lower end surface of the clamping portion 16 can abut against an upper end surface of the mounting base 5.

Alternatively, an end of the mounting base 5 away from the valve port 12 can be provided with a mounting groove 51. Specifically, the mounting groove 51 can be provided at an end surface of the mounting base 5 opposite to the valve seat 14. The mounting groove 51 can be provided with a sealing member 6, and the mounting base 5 can be sealed with the valve seat 14 by the sealing member 6, which is conducive to strengthening sealing performance between the mounting base 5 and the valve seat 14. The valve seat 14 can be provided with an inlet channel 18 and an outlet channel 19 connected to and in communication with both the valve port 12 and the first mounting cavity 11. The valve port 12 can be controlled to open and close to control opening and closing of the inlet channel 18 and the outlet channel 19. An end of the valve seat 14 away from the clamping portion 16 can extend along an axial direction thereof to form an extending portion 141, and an outer diameter of the extending portion 141 can be less than an outer diameter of the valve seat 14 at the inlet channel 18. A junction of the inlet channel 18 of the valve seat 14 and the extending portion 141 can form a first step 142, and an inner surface of the mounting base 5 can be provided with a second step 52, and the first step 142 can abut against the second step 52. The outer surface of the extending portion 141 can be provided with a first groove 143 configured for mounting the sealing member 6, and the first groove 143 can be provided along a circumference direction of the extending portion 141.

Alternatively, the clamping portion 16 can be provided with at least two clamping planes. An external mounting tool can match with the clamping planes to connect and tighten the valve seat 14 and the mounting base 5, thereby improving mounting efficiency of the electromagnetic valve.

Alternatively, referring to FIG. 1 to FIG. 3, the clamping portion 16 of the valve seat 14 can be provided with a plurality of clamping planes, such as six clamping planes. The plurality of clamping planes can be evenly distributed along a circumference direction of the valve seat 14. In other embodiments, the number of the clamping planes is not limited herein.

In an embodiment, referring to FIG. 1 to FIG. 3, the valve body 1 can further include a valve cover 15, an outer surface of the valve cover 15 can be sealed with and connected to a side wall of the first mounting cavity 11, and the valve cover 15 cannot slide relative to the valve seat 14. An end of the valve cover 15 proximal to the valve port 12 is provided with a concave cavity 151 configured for accommodating the plugging assembly 2, and an end of the plugging assembly 2 away from the valve port 12 can be sealed with and slidably connected to a side wall of the concave cavity 151.

In an embodiment, the electromagnetic valve 100 can further include an electromagnetic driving assembly 4. The electromagnetic driving assembly 4 can be configured to drive the plugging assembly 2 to move back and forth along the axis of the valve body 1, thus achieving opening or closing the valve port 12

Specifically, the electromagnetic driving assembly 4 can include an electromagnetic unit, a valve pin unit, and a magnetic conducting frame 49. The magnetic conducting frame 49 can be disposed on the valve seat 14, and configured to limit and position the electromagnetic unit. When the electromagnetic unit is energized, the valve pin unit can be driven to move away from the plugging assembly 2 to open the electromagnetic valve. When the electromagnetic unit is powered off, the plugging assembly 2 can move towards the valve port 12 until the valve port 12 is tightly sealed by the plugging assembly 2 and closed.

The electromagnetic unit can include an electromagnetic coil 42, a stator 43 fixed relative to the electromagnetic coil 42 and a rotor 44 movably along the axial direction of the valve seat 14. The electromagnetic coil 42 can be sleeved outside the stator 43 and the rotor 44, and the electromagnetic coil 42 can be fixed in the magnetic conducting frame 49. A second elastic member 47 can be further provided between the stator 43 and the rotor 44, a second mounting cavity 45 can be provided in the rotor 44, and the second mounting cavity 45 can extend to two ends of the rotor 44 along an axial direction thereof. The second elastic member 47 can be at least partially movably disposed in the second mounting cavity 45. The valve pin unit can be driven to move towards the plugging assembly 2 under an elastic recovery action of the second elastic member 47, and the plugging assembly 2 can be driven to move towards the valve port 12 by the valve pin unit, so as to close the valve port 12.

The electromagnetic driving assembly 4 can further include a sleeve 41. An end of the sleeve 41 proximal to the valve seat 14 can extend outside the magnetic conducting frame 49 and be fixedly connected to the valve cover 15. The stator 43 can be fixed at the other end of the sleeve 41 away from the valve seat 14, the rotor 44 can be movably disposed in the sleeve 41, and the electromagnetic coil 42 can be sleeved outside the sleeve 41.

The valve pin unit can include a valve pin 46 and a valve pin elastic member 48. The valve pin 46 can be movably disposed in the second mounting cavity 45. An end of the valve pin elastic member 48 can abut against an end of the valve pin 46 proximal to the stator 43, and the other end of the valve pin elastic member 48 can abut against an end of the second mounting cavity 45 proximal to the valve seat 14.

Specifically, an end of the plugging assembly 2 proximal to the valve pin 46 can be provided with a pilot valve seat having a pilot valve port 22, and the valve pin 46 can be driven by the electromagnetic unit to open and close the pilot valve port 22. A center of the plugging assembly 2 can be provided with a pilot hole 23. The pilot hole 23 can extend to two ends of the plugging assembly 2 along an axial direction thereof, and the pilot hole 23 can be connected to and in communication with the pilot valve port 22. The pilot valve port 22 and the pilot hole 23 can be provided, so that there is a differential pressure force on both sides of the plugging assembly 2 when the plugging assembly 2 opens or closes the electromagnetic valve, thereby reducing difficulty of opening or closing the electromagnetic valve. Taking a normally closed electromagnetic valve as an example, when the electromagnetic unit is energized, the pilot valve port 22 can open before the valve port 12. At this time, pressure is relieved through the pilot valve port 22 and the pilot hole 23 on a side of the plugging assembly 2 proximal to the valve pin 46. A differential pressure force can be formed at two ends of the plugging assembly 2. The plugging assembly 2 can have a lower pressure at an upper end of the plugging assembly 2 and a higher pressure at a lower end of the plugging assembly 2. Under an action of the differential pressure force, the plugging assembly 2 can be pushed by fluid pressure to move upward to open the valve port 12. When the electromagnetic unit is powered off, under an action of the second elastic member 47 and gravity of the valve pin 46 itself, the valve pin 46 can be reset, and the pilot valve port 22 can be closed. At this time, the plugging assembly 2 can be driven to move down, and the valve port 12 can be closed. Pressure in a chamber of the plugging assembly 2 proximal to the valve port can increase, and the plugging assembly 2 can be pressurized by the fluid, thus achieving a better sealing performance.

In the present disclosure, a process of opening the electromagnetic valve 100 (taking the normally closed electromagnetic valve as an example) can be as follows. When the electromagnetic coil 42 is energized, the rotor 44 can move towards the stator 43, the rotor 44 can overcome an elastic force of the second elastic member 47 and move upward, thereby driving the valve pin 46 to move away from the valve seat 14. After the pilot valve port 22 opens, the pressure relief in the chamber of the plugging assembly 2 proximal to the valve pin 46 can be achieved. The plugging assembly 2 can move away from the valve port 12 under a push of first elastic member 3 and the differential pressure force formed at the upper end and the lower end of the plugging assembly 2. At this time, a gap between the rotor 44 and the stator 43 can be small, and a suction force at this stage can be much greater than that in an initial stage. In addition, the rotor 44 can have a great kinetic energy, it can be easy to open the electromagnetic valve, and a capacity for opening an electromagnetic valve can be far better than a conventional structure. Finally, the rotor 44 and the stator 43 can be fully attracted, at this time the valve pin 46 can continue to move upwards to an upper limiting position under an action of the valve pin elastic member 48. The plugging assembly 2 can move upwards to fit with the valve cover 15, and the valve port 12 can reach to a fully opening state.

When the electromagnetic coil 42 is powered off, the rotor 44 is not subject to a magnetic attraction of the stator 43. The rotor 44 can drive the valve pin 46 to move downward under the elastic force of the second elastic member 47 and the valve pin elastic member 48, and the gravity of the valve pin 46 itself, so as to the pilot valve port 22 can be closed.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure, and these variations and modifications belong to the scope of the claimed disclosure. Therefore, the scope of the disclosure should be determined by the appended claims.

What is claimed is:

1. An electromagnetic valve, comprising a valve body and a plugging assembly, wherein the valve body is provided with a first mounting cavity and a valve port, and the plugging assembly is accommodated in the first mounting cavity for opening or closing the valve port, the electromagnetic valve further comprises a first elastic member, an end of the first mounting cavity proximal to the valve port is provided with a limiting portion integrated with the valve body, the first elastic member is sleeved on the plugging assembly, one end of the first elastic member abuts against the plugging assembly, the other end of the first elastic member abuts against the valve body, and an outer surface of the other end of the first elastic member abuts against the limiting portion;

the limiting portion is a protrusion disposed in the first mounting cavity and extending along an axial direction of the plugging assembly and the outer surface of the first elastic member abuts against a side surface of the protrusion.

2. The electromagnetic valve of claim 1, wherein a diameter of a part of the first mounting cavity of the valve body is greater than an outer diameter of the first elastic member.

3. An electromagnetic valve assembly, comprising a mounting base and an electromagnetic valve of claim 1, wherein the electromagnetic valve is detachably connected to the mounting base.

4. The electromagnetic valve assembly of claim 3, wherein an end of the mounting base away from the valve port is provided with a mounting groove, the mounting groove is provided with a sealing member, and the mounting base is sealed with and connected to the valve body by the sealing member.

5. An electromagnetic valve, comprising a valve body and a plugging assembly, wherein the valve body is provided with a first mounting cavity and a valve port, and the plugging assembly is accommodated in the first mounting cavity for opening or closing the valve port, the electromagnetic valve further comprises a first elastic member, an end of the first mounting cavity proximal to the valve port is provided with a limiting portion integrated with the valve body, the first elastic member is sleeved on the plugging assembly, one end of the first elastic member abuts against the plugging assembly, the other end of the first elastic member abuts against the valve body, and an outer surface of the other end of the first elastic member abuts against the limiting portion; an end of the first elastic member proximal to the valve port is provided with a first inelastic section.

6. The electromagnetic valve of claim 5, wherein the limiting portion is a protrusion or a limiting groove, the protrusion is disposed in the first mounting cavity and extends along an axial direction of the plugging assembly, a bottom of the first mounting cavity at an end of the first mounting cavity proximal to the valve port is concave and defined as the limiting groove, a height of the protrusion or a depth of the limiting groove is equal to or less than a height of the first inelastic section.

7. The electromagnetic valve of claim 6, wherein the first elastic member is a spring, an end of the spring proximal to the valve port is provided with at least two coils of spring wires attached to each other, and the at least two coils of spring wires of the spring are defined as the first inelastic section.

8. The electromagnetic valve of claim 7, wherein the height of the protrusion or the depth of the limiting groove is equal to or less than a sum of wire diameters of the two coils of the spring wires attached to each other.

9. An electromagnetic valve, comprising a valve body and a plugging assembly, wherein the valve body is provided with a first mounting cavity and a valve port, and the plugging assembly is accommodated in the first mounting cavity for opening or closing the valve port, the electromagnetic valve further comprises a first elastic member, an end of the first mounting cavity proximal to the valve port is provided with a limiting portion integrated with the valve body, the first elastic member is sleeved on the plugging assembly, one end of the first elastic member abuts against the plugging assembly, the other end of the first elastic member abuts against the valve body, and an outer surface of the other end of the first elastic member abuts against the limiting portion; an end of the first elastic member away from the valve port is provided with a second inelastic section and the second inelastic section abuts against an end of the plugging assembly away from the valve port.

10. The electromagnetic valve of claim 9, wherein an end of the plugging assembly abutting against the first elastic member is provided with a groove portion, the second inelastic section is accommodated in the groove portion, and an outer surface of the second inelastic section abuts against a side wall of the groove portion proximal to the first mounting cavity.

11. The electromagnetic valve of claim 10, wherein a depth of the groove portion is equal to or less than a height of the second inelastic section.

12. The electromagnetic valve of claim 11, wherein the first elastic member is a spring, an end of the spring abutting against the plugging assembly is provided with at least two coils of spring wires attached to each other, the at least two coils of spring wires of the spring are defined as the second inelastic section, and the depth of the groove portion is equal to or less than a sum of wire diameters of the two coils of the spring wires attached to each other.

* * * * *